United States Patent
Feng et al.

(10) Patent No.: US 8,461,737 B2
(45) Date of Patent: Jun. 11, 2013

(54) PERMANENT-MAGNET (PM) ROTORS AND SYSTEMS

(75) Inventors: Xueqing Feng, Austin, TX (US); Lijun Liu, Hangzhou (CN)

(73) Assignee: TECO-Westinghouse Motor Company, Round Rock, TX (US)

( * ) Notice: Subject to any disclaimer, the term of this patent is extended or adjusted under 35 U.S.C. 154(b) by 315 days.

(21) Appl. No.: 12/627,694

(22) Filed: Nov. 30, 2009

(65) Prior Publication Data

US 2010/0133941 A1 Jun. 3, 2010

(51) Int. Cl.
*H02K 21/12* (2006.01)

(52) U.S. Cl.
USPC ............ 310/156.83; 310/156.53; 310/156.56; 310/156.78; 310/156.81; 310/156.82

(58) Field of Classification Search
CPC .......... H02K 1/276; H02K 21/46; H02K 1/223
USPC ............. 310/156.53, 156.56, 156.78, 156.83, 310/156.57, 156.81, 156.82
IPC ..................................................... H02K 21/12
See application file for complete search history.

(56) References Cited

U.S. PATENT DOCUMENTS

| | | | |
|---|---|---|---|
| 2,418,980 A | 4/1947 | Morrill | 310/156.76 |
| 3,492,520 A | 1/1970 | Yates | 310/156.79 |
| 3,710,156 A | 1/1973 | Laing | 310/54 |
| 4,060,745 A | 11/1977 | Linscott, Jr. | 310/156.22 |
| 4,127,786 A | 11/1978 | Volkrodt | 310/156.84 |
| 4,139,790 A | 2/1979 | Steen | 310/156.83 |
| 4,139,990 A | 2/1979 | Barnes | 62/5 |
| 4,144,469 A | 3/1979 | Miyashita et al. | 310/156.28 |
| 4,309,635 A | 1/1982 | Sei et al. | 310/211 |
| 4,322,648 A | 3/1982 | Ray et al. | 310/156.55 |
| 4,358,696 A | 11/1982 | Liu et al. | 310/156.56 |
| 4,403,161 A | 9/1983 | Miyashita et al. | 310/156.83 |
| 4,405,873 A | 9/1983 | Nondahl | 310/156.56 |
| 4,454,438 A | 6/1984 | Yamashita et al. | 310/162 |
| 4,486,679 A | 12/1984 | Jones | 310/407 |
| 4,502,752 A | 3/1985 | Montagu | 359/199.1 |
| 4,506,181 A | 3/1985 | Jones et al. | 310/156.78 |
| 4,516,046 A | 5/1985 | Mercier | 310/154.11 |
| 4,559,463 A | 12/1985 | Kobayashi | 310/156.53 |
| 4,568,846 A | 2/1986 | Kapadia | 310/156.83 |
| 4,599,530 A | 7/1986 | Laing | 310/90 |

(Continued)

FOREIGN PATENT DOCUMENTS

| CN | 1717853 | 1/2006 |
|---|---|---|
| DE | 102 54 967 | 6/2004 |

(Continued)

OTHER PUBLICATIONS

Tarimer and Ocak, "Performance comparison of internal and external rotor structured wind generators mounted from same permanent magnets on same geometry," *Electronics and Electrical Engineering*, pp. 65-70, 2009.

*Primary Examiner* — John K Kim (74) *Attorney, Agent, or Firm* — Fulbright & Jaworski L.L.P.

(57) ABSTRACT

Line-start permanent-magnet (LSPM) rotors, rotor components, and machines using LSPM rotors, where the PM rotors have PM bulks in W-like shapes, vent openings between PM bulks, and/or air gaps at ends of PM bulks in the W-like shapes.

11 Claims, 6 Drawing Sheets

U.S. PATENT DOCUMENTS

| | | | | |
|---|---|---|---|---|
| 4,620,120 | A | 10/1986 | Laing | 310/166 |
| 4,760,300 | A | 7/1988 | Yoshida et al. | 310/211 |
| 4,845,837 | A | 7/1989 | Lloyd | 29/598 |
| 4,883,999 | A | 11/1989 | Hendershot | 310/216.071 |
| 4,922,152 | A * | 5/1990 | Gleghorn et al. | 310/156.84 |
| 5,013,951 | A | 5/1991 | Stadnik et al. | 310/156.07 |
| 5,097,166 | A | 3/1992 | Mikulic | 310/156.83 |
| 5,155,404 | A | 10/1992 | Sadarangani | 310/211 |
| 5,159,220 | A * | 10/1992 | Kliman | 310/156.56 |
| 5,162,685 | A | 11/1992 | Yamaguchi et al. | 310/156.28 |
| 5,169,220 | A * | 12/1992 | Herr et al. | 312/305 |
| 5,402,026 | A | 3/1995 | Gertmar et al. | 310/182 |
| 5,444,319 | A | 8/1995 | Nakamura et al. | 310/211 |
| 5,548,172 | A | 8/1996 | Kliman et al. | 310/156.53 |
| 5,729,885 | A | 3/1998 | Carosa et al. | 29/598 |
| 5,731,647 | A | 3/1998 | Schuller et al. | 310/114 |
| 5,818,139 | A | 10/1998 | Yamagiwa et al. | 310/156.45 |
| 5,952,757 | A | 9/1999 | Boyd, Jr. | 310/156.81 |
| 5,952,764 | A | 9/1999 | Nakamura et al. | 310/216.004 |
| 6,088,906 | A | 7/2000 | Hsu et al. | 310/211 |
| 6,268,677 | B1 | 7/2001 | Takabatake et al. | 310/156.55 |
| 6,603,232 | B2 | 8/2003 | Van Dine et al. | 310/156.01 |
| 6,624,538 | B2 | 9/2003 | Janisiewicz et al. | 310/12.25 |
| 6,664,688 | B2 | 12/2003 | Naito et al. | 310/156.01 |
| 6,727,624 | B2 | 4/2004 | Morita et al. | 310/156.78 |
| 6,727,627 | B1 | 4/2004 | Sasaki et al. | 310/211 |
| 6,844,652 | B1 | 1/2005 | Chu et al. | 310/216.097 |
| 6,853,106 | B2 | 2/2005 | Fujiwara et al. | 310/184 |
| 6,867,527 | B2 | 3/2005 | Moore | 310/211 |
| 6,876,119 | B2 | 4/2005 | Sasaki et al. | 310/211 |
| 6,891,300 | B2 | 5/2005 | Noda et al. | 310/156.78 |
| 6,940,199 | B2 | 9/2005 | Imamura et al. | 310/156.48 |
| 7,019,427 | B2 | 3/2006 | Sasaki et al. | 310/156.78 |
| 7,030,530 | B2 | 4/2006 | Malmberg | 310/156.28 |
| 7,038,345 | B2 | 5/2006 | Fratta | 310/156.53 |
| 7,102,259 | B2 | 9/2006 | Kawaguchi et al. | 310/61 |
| 7,102,264 | B2 | 9/2006 | Yanashima et al. | 310/156.57 |
| 7,183,686 | B2 | 2/2007 | Sasaki et al. | 310/156.78 |
| 7,247,965 | B2 | 7/2007 | Weihrauch | 310/156.78 |
| 7,365,466 | B2 | 4/2008 | Weihrauch et al. | 310/156.78 |
| 7,372,183 | B2 | 5/2008 | Sasaki et al. | 310/156.78 |
| 7,466,054 | B2 | 12/2008 | Watson et al. | 310/156.08 |
| 7,548,006 | B2 | 6/2009 | Yu | 310/156.12 |
| 7,560,842 | B2 | 7/2009 | Hattori | 310/156.53 |
| 2003/0080640 | A1 | 5/2003 | Weiglhofer et al. | 310/156.12 |
| 2007/0052313 | A1* | 3/2007 | Takahashi et al. | 310/156.53 |
| 2007/0063607 | A1* | 3/2007 | Hattori | 310/156.53 |
| 2007/0096577 | A1* | 5/2007 | Guven et al. | 310/156.53 |
| 2007/0103024 | A1 | 5/2007 | Nakayama et al. | 310/156.53 |
| 2007/0138893 | A1 | 6/2007 | Son | 310/156.83 |
| 2007/0138894 | A1 | 6/2007 | Shin | 310/156.83 |
| 2007/0228858 | A1 | 10/2007 | Malmberg | 310/156.01 |
| 2007/0252467 | A1* | 11/2007 | Hoemann et al. | 310/156.53 |
| 2008/0093944 | A1* | 4/2008 | Takahashi et al. | 310/156.02 |
| 2008/0197737 | A1 | 8/2008 | Poulin et al. | 310/156.08 |
| 2008/0231135 | A1* | 9/2008 | Suzuki et al. | 310/156.53 |
| 2008/0258573 | A1 | 10/2008 | Kamiya | 310/156.02 |
| 2008/0265706 | A1* | 10/2008 | Nakayama et al. | 310/156.53 |
| 2008/0272667 | A1 | 11/2008 | Ionel et al. | 310/156.83 |
| 2009/0045688 | A1* | 2/2009 | Liang et al. | 310/156.07 |
| 2009/0091200 | A1 | 4/2009 | Weihrauch | 310/61 |
| 2009/0115280 | A1 | 5/2009 | Nakayama et al. | 310/156.53 |
| 2009/0140593 | A1 | 6/2009 | Kaiser et al. | 310/156.53 |
| 2010/0133941 | A1* | 6/2010 | Feng et al. | 310/156.83 |

FOREIGN PATENT DOCUMENTS

| | | |
|---|---|---|
| DE | 103 57 230 | 3/2005 |
| JP | 2001 025189 | 1/2001 |
| WO | WO 2007/025180 | 3/2007 |
| WO | WO 2007/073086 | 6/2007 |

* cited by examiner

PERMANENT-MAGNET (PM) ROTORS AND SYSTEMS

RELATED APPLICATIONS

This application claims benefit under 35 U.S.C. §119(a) to Chinese utility model registration No. 200820168703.5, filed on Dec. 1, 2008, which is incorporated by reference.

BACKGROUND

1. Field of the Invention

The present invention relates generally to rotors and electrical machines using rotors, and, more particularly, but not by way of limitation, to line-start permanent-magnet (LSPM) rotors, rotor components, and machines comprising LSPM rotors.

2. Description of Related Art

Rotors and machines using rotors have been known in the art for some time. Electrical machines such as motors traditionally include brushes and a rotor with wire windings. Such traditional winding-based rotors are relatively inefficient compared with PM rotors, and PM rotors may generally be made smaller than traditional winding-based rotors for a given capacity or output. As a result, machines using PM rotors may generally be made smaller than those with traditional winding-based rotors. PM rotors generally use permanent magnet material instead of traditional electrical wire windings, such that a PM rotor machine does not require reactive current from a power supply. As such, power consumption of PM machines can generally be reduced relative to those using traditional winding-based rotors for a given output. For example, some PM rotor machines can achieve a higher power factor, higher power density, and higher efficiency (e.g., 25% to 120% of the rated load) relative to a traditional winding-based machine. Maintenance costs of PM machines may also be reduced, as the simpler configuration (e.g., without windings, brushes, etc.) may result in fewer parts or points of potential failure. Some embodiments of PM machines are known as line-start permanent-magnet (LSPM) machines, and may include what is known as a "squirrel cage" with a plurality of bars around the LSPM rotor core.

SUMMARY OF THE INVENTION

The present disclosure includes various embodiments of LSPM rotors and LSPM-rotor machines.

Some embodiments of the present line-start permanent-magnet (LSPM) rotors comprise: a rotor core having an axis of rotation and an outer perimeter, the rotor core defining a plurality of permanent magnet (PM) openings and a plurality of vent openings distinct from the PM openings; and a plurality of PM bulks disposed in the PM openings of the rotor core; where the rotor is configured such that the plurality of PM bulks define at least four W-like shapes, each W-like shape defined by at least two medial PM bulks disposed between at least two adjacent peripheral PM bulks; and where the vent openings are disposed around the axis of rotation such that each vent opening is disposed between a medial PM bulk and the adjacent peripheral PM bulk.

In some embodiments, each vent opening is defined by an outer arc, an inner arc that has a radius that is smaller than the radius of the outer arc, and two non-parallel lines extending between the outer arc and the inner arc. In some embodiments, the center of the inner arc is disposed on a bisecting line that bisects the sides of the medial PM bulk and the adjacent peripheral PM bulk that are nearest the bisecting line. In some embodiments, the bisecting line does not extend through the axis of rotation. In some embodiments, the outer arc is a semicircle, the inner arc is a semicircle, and the non-parallel lines extend between the ends of the inner arc and the ends of the outer arc.

In some embodiments, each vent opening is configured such that a line between the centers of the inner and outer arcs is angled relative to the bisecting line. In some embodiments, the angle of the line between the centers of the inner and outer arcs relative to the bisecting line is given by:

$$\frac{|a-b|}{a} * 90 \text{ degrees,}$$

where b is the length of the medial PM bulk, and a is the length of the adjacent peripheral PM bulk. In some embodiments, if b<a then the respective vent opening is rotated toward the medial PM bulk, and if b>a then the respective vent opening is rotated toward the adjacent peripheral PM bulk. In some embodiments, each W-like shape shares a peripheral PM bulk with another W-like shape, such that each peripheral PM bulk partially defines two adjacent W-like shapes. In some embodiments, each peripheral PM bulk has a width that is between 150% and 250% of the width of one of the medial PM bulks.

In some embodiments, each peripheral PM bulk has an outer end and an inner end that is closer than its outer end to the axis of rotation, each medial PM bulk has an outer end and an inner end that is closer than its outer end to the axis of rotation, and the PM openings define air gaps that include: an outer peripheral air gap at or near the outer ends of each peripheral PM bulk, an inner peripheral air gap at or near the inner end of each peripheral PM bulk, an outer medial air gap at or near the outer ends of adjacent medial PM bulks, and an inner medial air gap at or near the inner end of each medial PM bulk.

Some embodiments further comprise: a squirrel cage having a plurality of bars disposed around the rotor core; where the outer peripheral air gaps are disposed between the peripheral PM bulks and the bars of the squirrel cage.

Some embodiments of the present line-start permanent-magnet (LSPM) rotors comprise: a rotor core having an axis of rotation and an outer perimeter, the rotor core defining a plurality of permanent magnet (PM) openings; and a plurality of PM bulks disposed in the PM openings of the rotor core; where the rotor is configured such that the plurality of PM bulks define at least four W-like shapes, each W-like shape defined by at least two medial PM bulks disposed between at least two adjacent peripheral PM bulks; where adjacent W-like shapes share a common peripheral PM bulk; and where each peripheral PM bulk has a width that is between 150% and 250% of the width of one of the medial PM bulks.

In some embodiments, the peripheral PM bulks have a width that is between 180% and 220% of the width of the medial PM bulks. In some embodiments, the peripheral PM bulks have a width that is between 195% and 205% of the width of the medial PM bulks. Some embodiments further comprise: a squirrel cage having a plurality of bars disposed around the rotor core; where each peripheral PM bulk has an outer end and an inner end that is closer than its outer end to the axis of rotation, each medial PM bulk has an outer end and an inner end that is closer than its outer end to the axis of rotation, and the PM openings define air gaps that include: an outer peripheral air gap at or near the outer ends of each peripheral PM bulk, an inner peripheral air gap at or near the inner end of each peripheral PM bulk, an outer medial air gap at or near the outer ends of adjacent medial PM bulks, and an inner medial air gap at or near the inner end of each medial PM bulk; and where the outer peripheral air gaps are disposed between the peripheral PM bulks and the bars of the squirrel cage.

Some embodiments of the present line-start permanent-magnet (LSPM) rotors comprise: a rotor core having an axis of rotation and an outer perimeter, the rotor core defining a plurality of permanent magnet (PM) openings and a plurality of vent openings; and a plurality of PM bulks disposed in the PM openings of the rotor core; where the rotor is configured such that the plurality of PM bulks define at least four W-like shapes, each W-like shape defined by at least two medial PM bulks disposed between at least two adjacent peripheral PM bulks; where the PM openings define air gaps, and at least one air gap is located at or near one end of each PM bulk; and where each peripheral PM bulk has an outer end and an inner end that is closer than its outer end to the axis of rotation, each medial PM bulk has an outer end and an inner end that is closer than its outer end to the axis of rotation, and the air gaps include: an outer peripheral air gap at or near the outer ends of each peripheral PM bulk, an inner peripheral air gap at or near the inner end of each peripheral PM bulk, an outer medial air gap at or near the outer ends of adjacent medial PM bulks, and an inner medial air gap at or near the inner end of each medial PM bulk.

In some embodiments, the rotor defines inner walls between each inner peripheral air gap and two adjacent inner medial air gaps. In some embodiments, each inner wall has a thickness between 1 and 4 millimeters (mm). In some embodiments, the inner peripheral air gaps and the inner medial air gaps each has a substantially triangular shape.

Some embodiments further comprise: a squirrel cage having a plurality of bars disposed around the rotor core; where the outer peripheral air gaps are disposed between the peripheral PM bulks and the bars of the squirrel cage.

Any embodiment of any of the present rotors, rotor components, and machines can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DESCRIPTION OF ILLUSTRATIVE EMBODIMENTS

The term "coupled" is defined as connected, although not necessarily directly, and not necessarily mechanically; two items that are "coupled" may be integral with each other. The terms "a" and "an" are defined as one or more unless this disclosure explicitly requires otherwise. The terms "substantially," "approximately," and "about" are defined as largely but not necessarily wholly what is specified, as understood by a person of ordinary skill in the art.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a device or system that that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps. For example, in a rotor that comprises a rotor core having an axis of rotation; and a plurality of PM bulks, the rotor includes the specified elements but is not limited to having only those elements. For example, such a rotor could also include vent openings adjacent and/or between PM bulks.

Further, a device or structure that is configured in a certain way is configured in at least that way, but it can also be configured in other ways than those specifically described.

Figure 1:
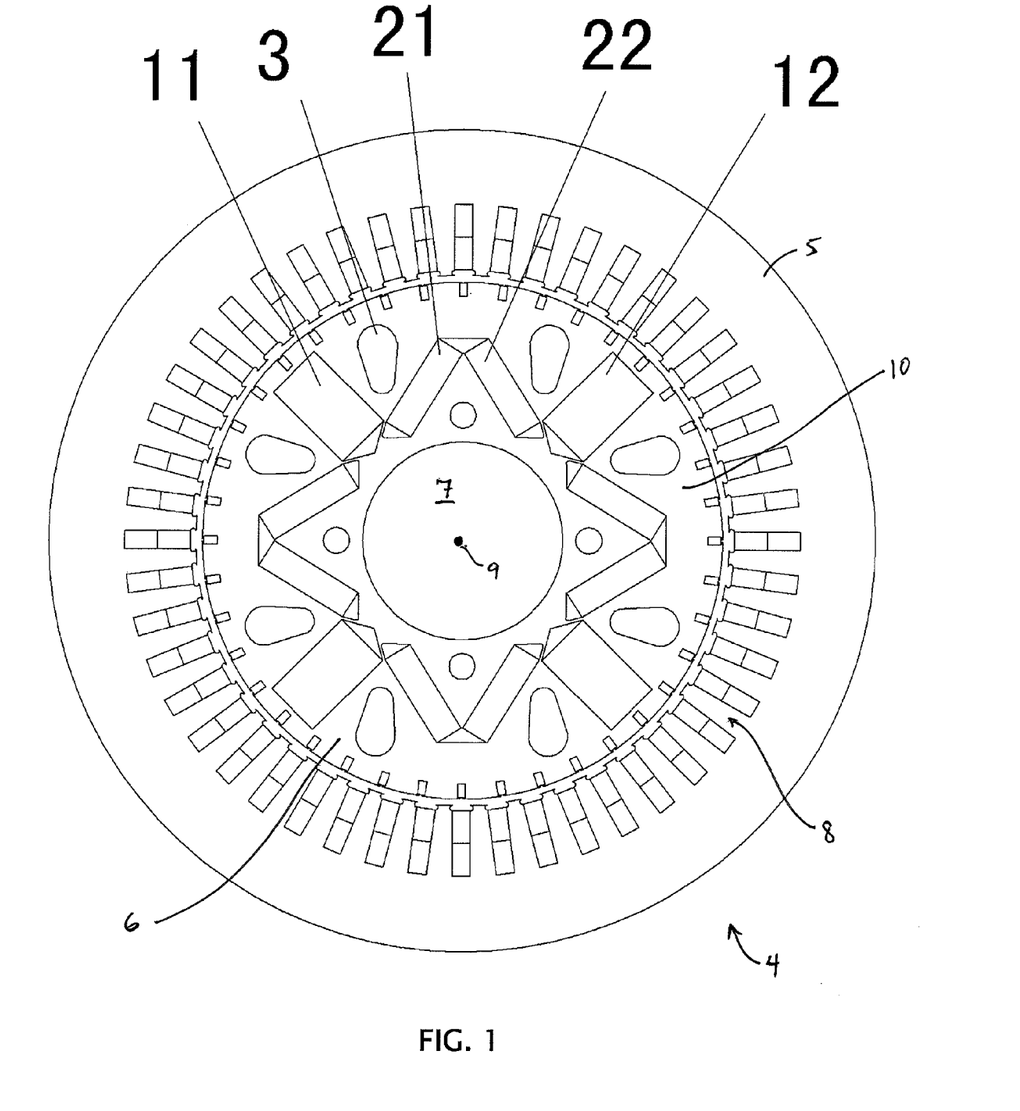
FIG. 1 depicts a cutaway end view of one of the present LSPM motors.

Referring now to the drawings, and more particularly to FIG. 1, one of the present line-start permanent-magnet (LSPM) motors 4 is shown. In the embodiment shown, motor 4 comprises: a stator 5, a rotor 6, and shaft 7. Stator 5 comprises slots and windings (collectively, 8). Rotor 6 comprises a rotor core 10 with an axis of rotation 9 (which is also the axis of rotation for shaft 7).

Figure 2:
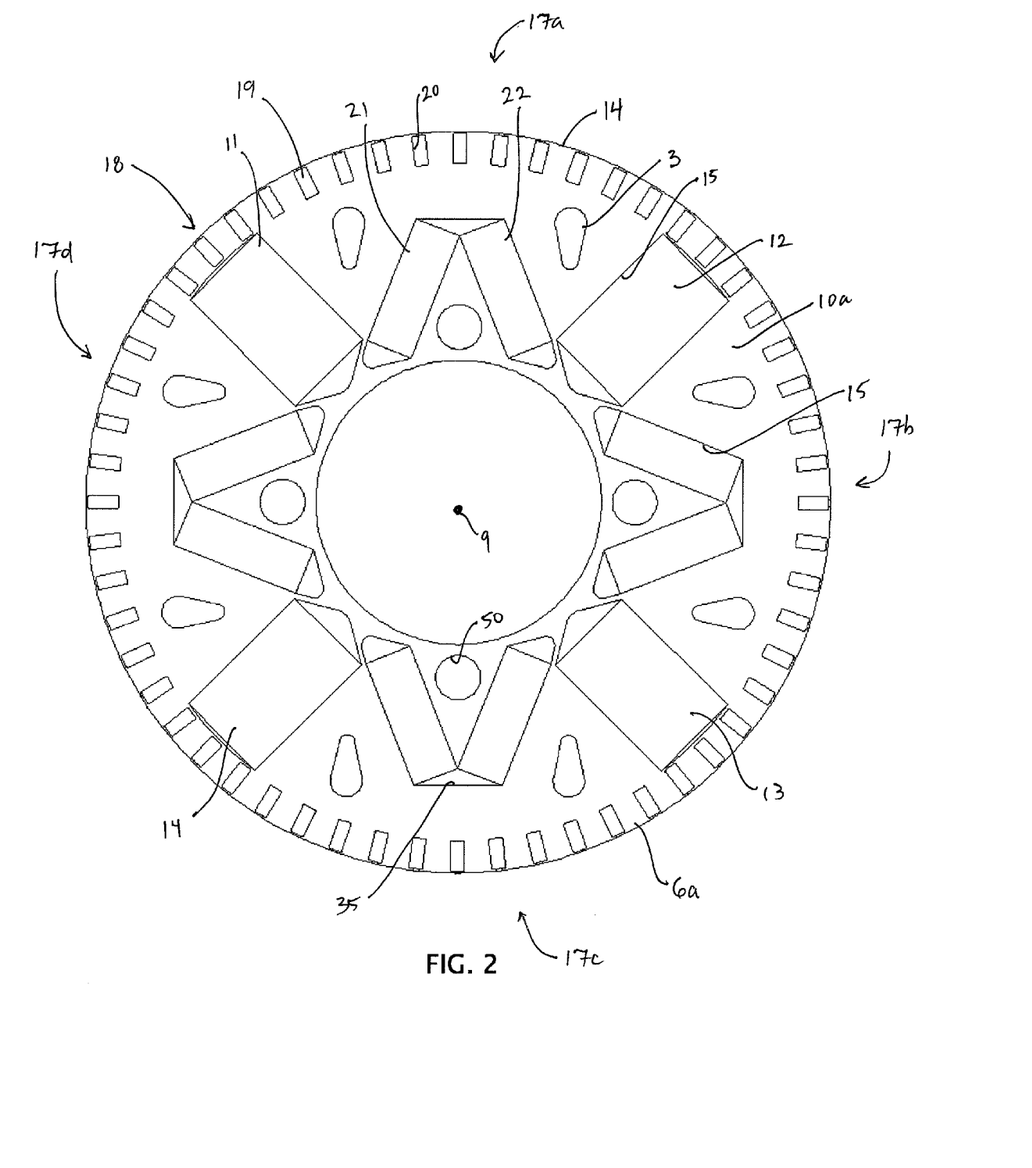
FIG. 2 depicts an end view of one of the present LSPM rotors.

FIG. 2 depicts another embodiment of a rotor 6a that is suitable for use in and/or with motor 4 (e.g., in place of rotor 6). In the embodiment shown, rotor 6a comprises a rotor core 10a having an axis of rotation 9 and an outer perimeter 14. Rotor core 10a defines a plurality of permanent magnet (PM) openings (collectively or generally, 15) and a plurality of vent openings (collectively or generally, 3) that are distinct from PM openings 15. Rotor 6a also comprises a plurality of PM bulks 11, 12, 21, and 22 coupled to rotor core 10a (e.g., disposed in PM openings 15 of rotor core 10a). Rotor 6a is configured such that the plurality of PM bulks (e.g., 11, 12, 21, 22) define at least four W-like shapes or regions 17a, 17b, 17c, 17d, where each W-like shape is defined by at least two medial PM bulks 21, 22 disposed between at least two adjacent peripheral PM bulks (e.g., 11, 12). As shown, each W-like shape (e.g., 17a, 17b, etc.) generally includes two V-like shapes or regions (e.g., one defined by peripheral PM bulk 11 and medial PM bulk 21, and one defined by medial PM bulk 22 and peripheral PM bulk 12). One W-like shape 17a is described in detail in this disclosure, and it should be understood that the remainder of the W-like shapes 17b, 17c, 17d are substantially similar to W-like shape 17a. Vent openings 3 are disposed around axis of rotation 9 such that each vent opening 3 is disposed between a medial PM bulk (e.g., 21) and the adjacent peripheral PM bulk (e.g., 11). In the embodiment shown, each W-like shape corresponds to a pole of rotor 6a such that rotor 6a includes four (4) poles. In other embodiments, the PM bulks can define any suitable number of W-like shapes (e.g., 2, 3, 5, 6, 7, 8, 9, or more).

In the embodiment shown, PM bulks (e.g., 11, 12, 21, 22) each comprise a single rectangular piece of PM material having a length (corresponding to the longest sides shown), a width (corresponding to the shortest sides shown), and a depth (extending into and/or out of the page perpendicular to the length and to the width). In this way, one wider PM bulk can be used for each peripheral PM bulk (e.g., 11) instead of two narrower, parallel PM bulks. For example, where each PM bulk comprises a single piece of PM material, it may be more convenient and/or less expensive to install PM bulks into rotor core 10a as rotor 6a is assembled. Normally, the width of each (or at least one) peripheral PM bulk 11 and 12 should be about the double width of each (or at least one) peripheral PM bulks 21 and 22. In other embodiments, PM bulks (e.g., 11, 12, 21, 22) can each comprise a plurality of pieces of PM material (e.g., in layers) that combine to define each PM bulk such that the length, width, and depth of each PM bulk span the multiple pieces that define the overall PM bulk. For example, in some embodiments, peripheral PM bulks 11, 12 each comprise two pieces each having the same length (e.g., the length of the PM bulks 11, 12) and each having a width that is one-half of the overall width of each PM bulk 11, 12. In the embodiment shown, each peripheral PM bulk 11, 12, 13, 14 has a width that is between 100% and 300% (e.g., greater than, less than, equal to, or between any of: 110, 120, 130, 140, 150, 160, 170, 175, 180, 185, 190, 195, 200, 205, 210, 215, 220, 225, 230, 240, 250, 260, 270, 280, 290, 300 percent) of the width of one of medial PM bulks 21, 22. For example, in the embodiment shown, PM bulks 11, 12 each comprises a single piece of PM material having a width that is about (and/or substantially) equal to 200% of the width of PM bulk 21. Further, in the embodiment shown medial PM bulks 21 each have a width that is substantially equal to the width of each of medial PM bulks 22. As shown in FIGS. 1-5, each peripheral PM bulk may be radially aligned with axis of rotation 9, and peripheral PM bulks located on opposite sides of axis of rotation 9 may be aligned with each other (e.g., radially aligned with axis of rotation 9).

In the embodiment shown, each W-like shape (e.g., 17a) shares a peripheral PM bulk 11 or 12 with another (e.g., an adjacent) W-like shape (e.g., 17a), such that, for example, each peripheral PM bulk 11, 12, 13, 14 partially defines two adjacent W-like shapes). Stated another way, adjacent W-like shapes (e.g., 17a, 17b) share a common peripheral PM bulk (e.g., 12). For example, peripheral PM bulk 12 partially defines W-like shapes 17a and 17b, and so on for 17b and 17c, 17c and 17d, and 17d and 17a.

Rotor 6a further comprises a squirrel cage 18 including a plurality of bars 19 disposed around rotor core 10a. As is generally understood for LSPM motors by those of ordinary skill in the art, squirrel cage 18 will generally also include an end ring (not shown) on either end of rotor 6a, and squirrel cage 18 is configured to be used to start (and/or to assist with starting) LSPM motor 4. Rotor core 6a includes a plurality of slots 20 corresponding in shape and size to bars 19. As shown, slots 20 each have a generally rectangular shape with parallel lateral sides that are parallel to a line extending radially outward from axis of rotation 9 through the center of the slot 20. As will also generally be understood by those of ordinary skill in the art, bars 19 can be substantially parallel to axis of rotation 9, or can be skewed relative to axis of rotation 9. In other embodiments, squirrel cage 18 (and/or corresponding portions of rotor 6a) can be provided with any suitable configuration. For example, bars 19 can have any suitable cross-sectional shape and/or slots 20 can have any suitable (e.g., corresponding) shape.

Figure 3:
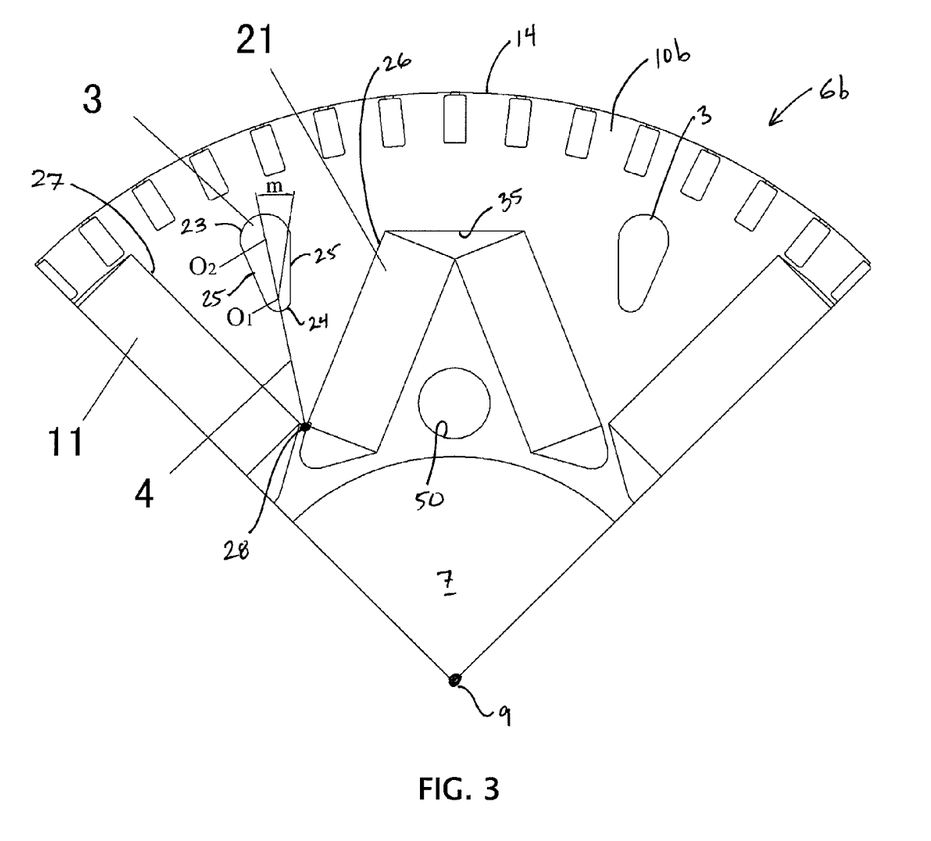
FIG. 3 depicts an enlarged end view of a portion of another embodiment of the present LSPM rotors.
Figure 4:
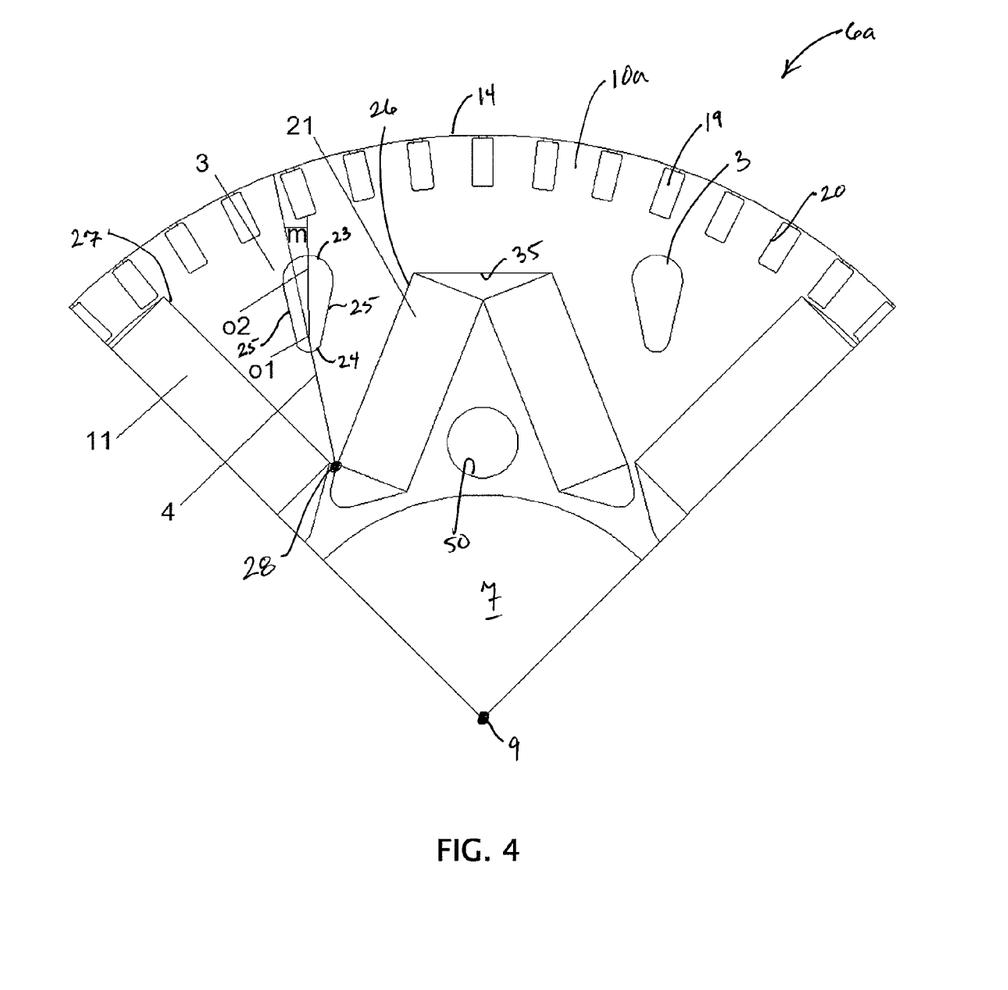
FIG. 4 depicts an end view of a portion of another embodiment of the present LSPM rotors.

For illustration, FIGS. 3 and 4 depict end views of portions (a single pole) of each of two embodiments of the present rotors. More particularly, FIG. 3 depicts a portion of an alternative embodiment 6b of the present rotors, and FIG. 4 depicts a portion of rotor 6a of FIG. 2. In the embodiment shown, each vent opening 3 is defined by an outer arc 23, an inner arc 24 that has a radius that is smaller than the radius of outer arc 23, and two non-parallel lines 25 extending between outer arc 23 and inner arc 24. Inner arc 24 has a center $O_1$ and outer arc 23 has a center $O_2$. Vent openings 3 are substantially similar (and, in each W-like shape, vent openings 3 are mirrored about medial PM bulks 21, 22), and, therefore, one vent opening 3 is described for each embodiment as generally representative of all vent openings 3 in the respective embodiments (except where otherwise noted). As noted above, each vent opening 3 is disposed between a medial PM bulk (e.g., 21) and the adjacent (e.g., nearest) peripheral PM bulk (e.g., 11). More particularly, in the embodiment shown, vent opening 3 is disposed on a bisecting line 4 that bisects the sides of the medial PM bulk (e.g., 21) and the adjacent peripheral PM bulk (e.g., 11) that are nearest the bisecting line (4). For example, side 26 of medial PM bulk 21 and side 27 of peripheral PM bulk 11 are the sides of these PM bulks that are nearest bisecting line 4. Bisecting line 4 originates at intersection 28 of sides 26, 27 (of lines projected along and from sides 26, 27) and extends away from axis of rotation 9 such that the angle between side 26 and bisecting line 4 is substantially equal to the angle between side 27 and bisecting line 4. In the embodiment shown, bisecting line 4 does not extend through axis of rotation 9.

In the embodiment shown, sides 26, 27 are the sides of PM bulks 11 and 21, respectively, and are substantially aligned with the corresponding sides of the respective PM openings 15 within which PM bulks 11 and 21 are disposed. In other embodiments, the sides of the PM openings may not be substantially aligned with the sides of the PM openings (e.g., where the sides of the PM openings or the sides of the PM bulks define air gaps, etc.), and in such embodiments, bisecting lines 4 can bisect the sides of the PM openings or can bisect the sides of the PM bulks.

In the embodiments shown (rotors 6a and 6b) in FIGS. 3 and 4, center $O_1$ of inner arc 24 is disposed on bisecting line 4. In the embodiment shown in FIG. 3, rotor 6b (e.g., rotor core 10b) is configured such that center $O_2$ of outer arc 23 is also disposed on bisecting line 4, such that vent opening 3 (e.g., a line extending between centers $O_1$, $O_2$ of inner and outer arcs 24, 23) is aligned with or not rotated relative to bisecting line 4, and angle m is zero (even though angle m is shown as non-zero for illustration purposes). This non-rotated configuration (relative to the rotated configuration of FIGS. 2 and 4) may decrease electromagnetic flux (EMF) of the stator winding, and/or the air-gap magnetic flux density, such that motor performance may be less efficient and/or more PM material may be required for comparable capacity etc.

Rotor core 10b is also configured such that outer arc 23 is a semicircle (has an angular sweep that is substantially equal to 180 degrees), inner arc 24 is a semicircle, and lines 25 are non-parallel and extend between the ends of inner arc 24 and the ends of outer arc 23. In other embodiments, the rotor core is configured such that the inner arc and/or the outer arc have an angular sweep such that lines 25 are tangent to the ends of both of the inner and outer arcs.

In the embodiments shown, vent opening 3 is symmetrical about the line between centers $O_1$, $O_2$. In embodiments (such as the one shown) in which outer and inner arcs 23, 24 are semicircles, the area of the opening between the two semicircles is given by Equation 1:

$$S=0.5*\pi*(R1^2+R2^2)+0.5*(R1+R2)*e, \quad (1)$$

where R1 and R2 are the radii of the inner and outer arcs (here, semicircles) 24 and 23, e is the distance between center $O_1$ and $O_2$. Area S, radii R1 and R2, and distance e, can be determined in any suitable fashion (e.g., to avoid rotor magnetic saturation, adjust or optimize magnetic flux density in the rotor, provide adequate ventilation for cooling, maintain sufficient mechanical strength, and/or a combination of any or all of these and/or other factors). For example, when the outside diameter of rotor 6a is set by a particular application of the rotor, the area S of vent opening 3 can be determined for cooling needs, such that R1 and R2, and distance e, can be determined from the area S (e.g., by trial and error, finite-element modeling, and/or the like). Similarly, the position of $O_1$ on bisecting line 4 can be determined by any suitable means (e.g., to avoid rotor magnetic saturation, adjust or optimize magnetic flux density in the rotor, provide adequate ventilation for cooling, maintain sufficient mechanical strength, and/or a combination of any or all of these and/or other factors). For example, where bisecting line 4 extends between intersection 28 and outer perimeter 14, $O_1$ can be disposed on bisecting line 4 at a distance from intersection 28 that is less than, greater than, substantially equal to, or between any of: 10, 15, 20, 25, 30, 35, 40, 45, 50, 55, 60, 65, 70, or 75 percent of the length of bisecting line 4.

In the embodiment of FIG. 4, rotor 6a (e.g., rotor core 10a) is configured such that opening 16a (e.g., a line extending between centers $O_1$, $O_2$) is angled or rotated (around center $O_1$ of inner arc 24) relative to bisecting line 4, such as, for example, by an angle m. In the embodiment shown, angle m (of the line between centers $O_1$, $O_2$ relative to bisecting line 4) is given by Equation 2:

$$\frac{|a-b|}{a}*90 \text{ degrees}, \quad (2)$$

where b is the length of the medial PM bulk (e.g., 21), and a is the length of the adjacent peripheral PM bulk (e.g., 11). For example, if the peripheral PM bulk 11 has a length a=40 mm, and medial PM bulk 21 has a length b=36 mm, then the angle m=9 degrees. In the embodiment shown, if b<a (i.e., the medial PM bulk is shorter than the adjacent peripheral PM bulk) then the respective vent opening 3 is rotated toward the medial PM bulk (e.g., 21), as shown; and if b>a (i.e., the medial PM bulk is longer than the adjacent peripheral PM bulk) then the respective vent opening 3 is rotated toward the adjacent peripheral PM bulk (e.g., 11), which is not shown. The rotated configuration of rotor 6a can improve motor performance, such as, for example, by improving the motor cooling system via improved ventilation afforded by the rotation of vent openings 3, obtaining better stator-winding EMF and air-gap magnetic flux density, and/or reducing the amount or volume of PM material required to achieve equivalent capacity.

Figure 5:
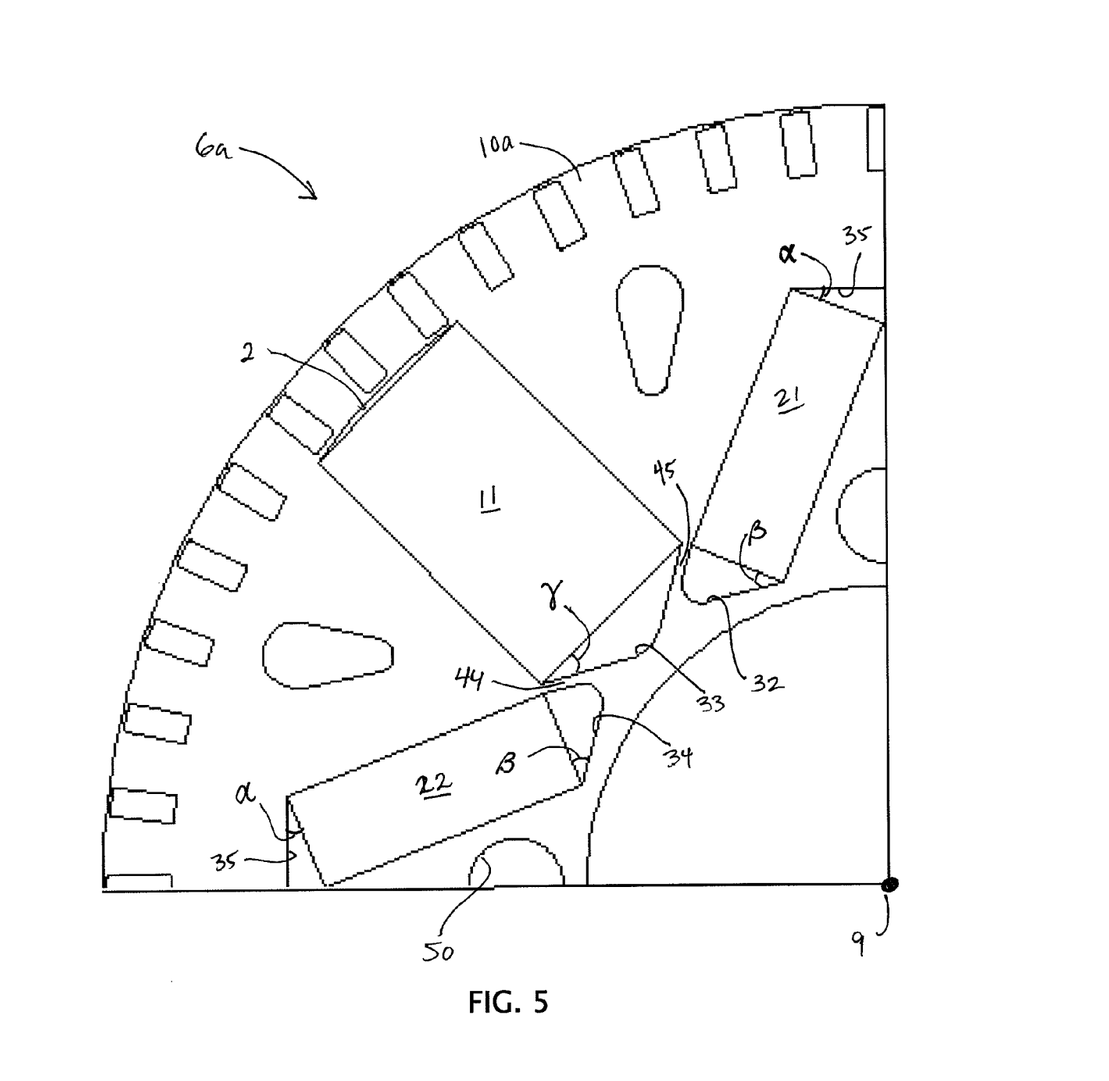
FIG. 5 depicts an end view of another portion of the rotor of FIG. 4.
Figure 6:
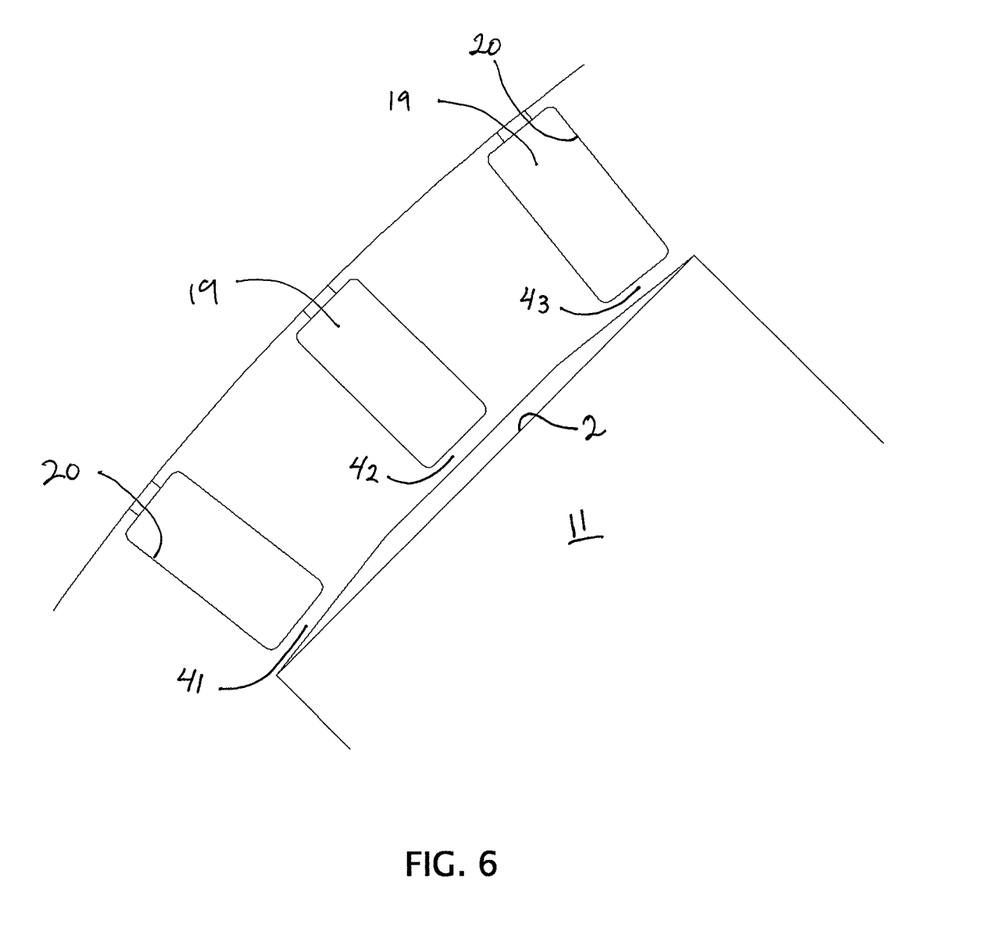
FIG. 6 depicts an end view of another portion of the rotor of FIGS. 4 and 5.

FIGS. 5 and 6 depict enlarged portions of rotor 6a of FIGS. 2 and 4. More particularly, FIG. 5 shows an enlarged portion of rotor 6a that includes one-half of each of two W-like shapes or regions (e.g., 17d, 17a), and FIG. 6 shows an enlarged portion of rotor 6a that includes an outer end of peripheral PM bulk 11. As shown, rotor core 10a is configured such that the PM openings define air gaps 2, 32, 33, 34, and 35, such as, for example, for ventilation, thermal insulation, and/or magnetic insulation. In the embodiment shown, each peripheral PM bulk (e.g., 11) has an outer end (adjacent air gap 2) and an inner end (adjacent air gap 33) that is closer to the axis of rotation 9 than the outer end. In the embodiment shown, each medial PM bulk 21, 22 has an outer end (adjacent air gap 35) and an inner end (e.g., adjacent air gap 32 or air gap 34) that is closer than its outer end to axis of rotation 9. In the embodiment shown, the air gaps include: an outer peripheral air gap 2 at or near the outer end of each peripheral PM bulk (e.g., 11), an inner peripheral air gap 33 at or near the inner end of each peripheral PM bulk (e.g., 11), an outer medial air gap 35 at or near the outer ends of adjacent medial PM bulks 21, 22, and an inner medial air gap 32, 34 at or near the inner end of each medial PM bulk 21, 22. The PM openings within which medial PM bulks 21 and 22 are disposed are integral (e.g., are two parts of a single PM opening), such that air gap 35 is at or near the outer ends of two adjacent medial PM bulks 21, 22, as shown. Stated another way, adjacent medial PM bulks 21, 22 share outer peripheral air gap 35.

Air gaps 2, 32, 33, 34, 35 can extend the depth of the rotor (e.g., parallel to axis of rotation 9) to define axial ventilation ducts through the rotor. In the embodiment shown, rotor core 10a is also configured to define inner walls (lathy magnetic barriers) 44, 45 between each inner peripheral air gap 33 and two adjacent inner medial air gaps 32, 34. Each of inner walls 44, 45 can have any suitable length, such as, for example, greater than half the width of one (or each) of medial PM bulks 21, 22 (e.g., greater than, substantially equal to, or between any of: 50, 55, 60, 65, 70, 75, 80, 85, 90, 95, or 100 percent of the width of one or each of medial PM bulks 21, 22). Each of inner walls 44, 45 can have any suitable width, such as, for example, between 1 mm and 4 mm (e.g., greater than, less than, substantially equal to, or between any of 1, 1.2, 1.4, 1.6, 1.8, 2, 2.2, 2.4, 2.6, 2.8, 3, 3.2, 3.4, 3.6, 3.8, 4, or more millimeters), or any other width that is suitable for the diameter of the rotor core and/or the designed or expected running speed of the rotor.

In the embodiment shown, air gaps 32, 33, 34, 35 each has a substantially triangular shape. Even though various vertices of the air gaps are rounded, each is defined by three primary sides, as shown, and, in the embodiment shown, at least one of the three primary sides is defined by an end of an adjacent PM bulk. For example, air gap 35 has first side defined by the outer end of peripheral PM bulk 21, a second side defined by the outer end of peripheral PM bulk 22, and a third side between the first and second sides, such that the angle α between the first and third sides is equal to the angle α between the second and third sides, as shown. In the embodiment shown, angle α is less than 45 degrees, and may be less than, substantially equal to, or between any of: 5, 10, 15, 20, 25, 30, 35, 40, or 45 degrees. Similarly, air gaps 32 and 34 each have a first side defined by the inner end of the respective medial PM bulk (21 or 22), a second side extending from the first side toward the adjacent peripheral PM bulk (e.g., 11), and a third side extending between the second side and the third side (parallel to a side of air gap 33), such that the angle β between the first side and the second side is less than 45 degrees, and may be less than, substantially equal to, or between any of: 5, 10, 15, 20, 25, 30, 35, 40, or 45 degrees. Similarly, air gaps 33 each have a first side defined by the inner end of the respective peripheral PM bulk (e.g., 11), a second side, and a third side that is a mirror image of the second side, as shown, such that the angle γ between the second side and the first side is equal to the angle γ between the third and the first sides. In the embodiment shown, angle γ is less than 45 degrees, and may be less than, substantially equal to, or between any of: 5, 10, 15, 20, 25, 30, 35, 40, or 45 degrees.

Air gaps 32, 33, 34, 35 and inner walls 44, 45 are configured to provide magnetic insulation (magnetic-barrier) to provide ventilation (e.g., for cooling), and to reduce flux leakage between PM bulks, such that the amount of PM material can be reduced and the performance of the motor can be improved, as described in this disclosure. Inner walls 44, 45 can also be configured to maintain structural strength, rigidity, durability, etc. of rotor core 10a.

As shown, outer peripheral air gaps 2 are between the peripheral PM bulks and bars 19 of the squirrel cage, such that rotor core 10a defines inner walls (magnetic barriers) 41, 42, 43 between each air gap 2 and slots 20 (and bars 19). In the embodiment shown, the outer boundary of air gap 2 is substantially parallel to the inner (nearest) adjacent side of each slot 20. Air gap 2 is configured to provide thermal insulation between bars 19 and peripheral PM bulks (e.g., 11). For example, when the LSPM motor starts up, electrical current in bars 19 may be very large, such that temperature rises substantially due to losses in bars 19. Such high temperatures may demagnetize PM bulks. As such, air gap 2 provides a thermal barrier to resist the flow of thermal energy (heat) from bars 19 to peripheral PM bulks (e.g., 11) during motor start-up. In this way, air gap 2 can also be configured to permit air to flow adjacent the outer ends of peripheral PM bulks to cool the PM bulks. Additionally, air gap 2 and inner walls 41, 42, 43 can be configured for magnetic insulation (to function as a magnetic-barrier), to reduce flux leakage between poles such that the volume or amount of PM material can be minimized and the motor performance can be improved. Inner walls 41, 42, 43 can be configured to provide structural strength and rigidity. Inner walls 41, 42, 43 can have any suitable width (e.g., less than, greater than, substantially equal to, or between any of: 20, 25, 30, 35, 40, 45, 50, 55, 60, 65, 70, 75, 80, 85, 90, 95, or 100 percent of the width of one or each of inner walls 44, 45). As will be understood by one of ordinary skill in the art, the width of any one of inner walls 44, 45 is defined by the shortest distance, at any given point along the respective inner wall, between the adjacent air gaps that define the inner wall. For example, the width of inner wall 44 is the shortest distance, at any given point along inner wall 44, between air gap 33 and air gap 34 (e.g., perpendicular to the longitudinal axis of inner wall 44).

In the embodiment shown, rotor core 10a further comprises a plurality of inner vent openings 50 disposed between the medial PM bulks 21, 22 of each W-like shape or region and between the W-like shape and axis of rotation 9. Inner vent openings 50 can be any suitable shape or size. For example, in the embodiment shown, inner vent openings 50 are circular and have a diameter that is smaller than the width of medial PM bulks 21, 22. In other embodiments, inner vent openings 50 can have a diameter that is less than, greater than, substantially equal to, or between any of: 10, 20, 30, 40, 50, 60, 70, 80, 90, 100, 120, 140, 160, 180, 200 percent of the width of one or each of medial PM bulks 21, 22.

Various embodiments of the present LSPM-rotor machines can comprise various embodiments of the present LSPM rotors. Examples of PM-rotor machines include motors, generators, synchronous motors and/or generators, and the like.

The various illustrative embodiments of rotors and machines described herein are not intended to be limited to the particular forms disclosed. Rather, they include all modifications and alternatives falling within the scope of the claims.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A line-start permanent-magnet (LSPM) rotor comprising:
   a rotor core having an axis of rotation and an outer perimeter, the rotor core defining a plurality of permanent magnet (PM) openings and a plurality of vent openings distinct from the PM openings; and
   a plurality of PM bulks disposed in the PM openings of the rotor core;
   where the rotor is configured such that the plurality of PM bulks define at least four W-like shapes, each W-like shape defined by at least two medial PM bulks disposed between at least two adjacent peripheral PM bulks;
   where the vent openings are disposed around the axis of rotation such that each vent opening is disposed between a medial PM bulk and the adjacent peripheral PM bulk, and such that each vent opening is disposed between a medial PM bulk and the outer perimeter of the rotor core;
   where each vent opening is defined by an outer arc, an inner arc that has a radius that is smaller than the radius of the outer arc, and two non-parallel lines extending between the outer arc and the inner arc; and
   where the center of the inner arc is disposed on a bisecting line that bisects the sides of the medial PM bulk and the adjacent peripheral PM bulk that are nearest the bisecting line.

2. The rotor of claim 1, where the bisecting line does not extend through the axis of rotation.

3. The rotor of claim 1, where the outer arc is a semicircle, the inner arc is a semicircle, and the non-parallel lines extend between the ends of the inner arc and the ends of the outer arc.

4. The rotor of claim 1, where each vent opening is configured such that a line between the centers of the inner and outer arcs is angled relative to the bisecting line.

5. The rotor of claim 4, where the angle of the line between the centers of the inner and outer arcs relative to the bisecting line is given by: $|a-b|/a*90$ degrees, where b is the length of the medial PM bulk, and a is the length of the adjacent peripheral PM bulk.

6. The rotor of claim 5, where if b<a then the respective vent opening is rotated toward the medial PM bulk, and if b>a then the respective vent opening is rotated toward the adjacent peripheral PM bulk.

7. The rotor of claim 6, where each W-like shape shares a peripheral PM bulk with another W-like shape, such that each peripheral PM bulk partially defines two adjacent W-like shapes.

8. The rotor of claim 7, where each peripheral PM bulk has a width that is between 150% and 250% of the width of one of the medial PM bulks.

9. The rotor of claim 8, where each peripheral PM bulk has an outer end and an inner end that is closer than its outer end to the axis of rotation, each medial PM bulk has an outer end and an inner end that is closer than its outer end to the axis of rotation, and the PM openings define air gaps that include: an outer peripheral air gap at or near the outer ends of each peripheral PM bulk, an inner peripheral air gap at or near the inner end of each peripheral PM bulk, an outer medial air gap at or near the outer ends of adjacent medial PM bulks, and an inner medial air gap at or near the inner end of each medial PM bulk.

10. The rotor of claim 9, further comprising:

a squirrel cage having a plurality of bars disposed around the rotor core;

where the outer peripheral air gaps are disposed between the peripheral PM bulks and the bars of the squirrel cage.

11. A line-start permanent-magnet (LSPM) rotor comprising:

a rotor core having an axis of rotation and an outer perimeter, the rotor core defining a plurality of permanent magnet (PM) openings and a plurality of vent openings; and a plurality of PM bulks disposed in the PM openings of the rotor core;

where the rotor is configured such that the plurality of PM bulks define at least four W-like shapes, each W-like shape defined by at least two medial PM bulks disposed between at least two adjacent peripheral PM bulks;

where each vent opening is disposed between a medial PM bulk and the outer perimeter of the rotor core;

where the PM openings define air gaps, and at least one air gap is located at or near one end of each PM bulk; and where each peripheral PM bulk has an outer end and an inner end that is closer than its outer end to the axis of rotation, each medial PM bulk has an outer end and an inner end that is closer than its outer end to the axis of rotation, and the air gaps include: an outer peripheral air gap at or near the outer ends of each peripheral PM bulk, an inner peripheral air gap at or near the inner end of each peripheral PM bulk, an outer medial air gap at or near the outer ends of adjacent medial PM bulks, and an inner medial air gap at or near the inner end of each medial PM bulk;

where the rotor defines inner walls between each inner peripheral air gap and two adjacent inner medial air gaps; and where each inner wall has a thickness between 1 and 4 millimeters (mm).

\* \* \* \* \*

UNITED STATES PATENT AND TRADEMARK OFFICE
CERTIFICATE OF CORRECTION

PATENT NO. : 8,461,737 B2
APPLICATION NO. : 12/627694
DATED : June 11, 2013
INVENTOR(S) : Xueqing Feng et al.

It is certified that error appears in the above-identified patent and that said Letters Patent is hereby corrected as shown below:

On Title page, Insert

-- (30) Foreign Application Priority Data
December 1, 2008   (CN) ..................... 200820168703.5 --

Signed and Sealed this
Twelfth Day of November, 2013

Teresa Stanek Rea
*Deputy Director of the United States Patent and Trademark Office*